Sept. 14, 1926. 1,600,163
J. BURNS
MEANS FOR UTILIZING THE WATER POWER OF CERTAIN STREAMS
Filed Jan. 26, 1925 2 Sheets-Sheet 2

Joseph Burns INVENTOR.
BY Emil F Lange
ATTORNEY.

Patented Sept. 14, 1926.

1,600,163

UNITED STATES PATENT OFFICE.

JOSEPH BURNS, OF LINCOLN, NEBRASKA.

MEANS FOR UTILIZING THE WATER POWER OF CERTAIN STREAMS.

Application filed January 26, 1925. Serial No. 4,824.

This application is filed as a continuation in part of my prior application Serial Number 728,922, filed July 29, 1924, for means for and a method of utilizing the water power of certain streams.

The Platte is the largest of the rivers having certain characteristics whch are common to many of the streams of the Middle West. It has great width compared with extreme shallowness, having been described as "a mile wide and an inch deep." The visible supply of water appears low, but at certain seasons it has a current movement of thirteen miles per hour, with a fall of eight feet to the mile.

The subsoil is sand and gravel which has been worn smooth and almost globular through constant rolling down stream. It extends to an average depth of about one hundred feet, and to a width of about twenty miles on each side of the river, making a total width of about forty miles. This immense body of sand and gravel is saturated with water, and the combined water and sand have a distinct and constant current. Thus the visible water supply, although itself great, is merely an insignificant fraction of the total quantity of water.

The possibility of utilizing this water power has for many years tempted engineers, but for reasons which will be explained in the following description the problems connected with the harnessing of such streams have, heretofore, been insoluble. Briefly, the object of my invention is to provide means and a method for utilizing some of this water power at a minimum cost of construction and at a minimum cost of operation.

Referring now to my drawings.

In carrying out my invention I construct a catch basin 10 and a power canal 11 paralleling the river 12 and in some cases I add the pumping plant 13 with a transmission line 14 from the power house to the pumping plant. All of these may be located on either side of the river, but such rivers are usually characterized by the fact that they have distinct bluffs or hills on one side and an exceedingly gentle slope on the other, which very often determines the most desirable location, since certain features of the catch basin and power canal and their relation to each other are important.

The catch basin may be constructed in any desirable dimensions, but I prefer to make it about three hundred feet wide and one or two or more miles long, and to so locate it that it will have about the same slope as that of the river bed. This basin is made in the sand and gravel subsoil by excavation and by forming dikes on either or both sides with the excavated material. I find that for this purpose the sand pump furnishes the means for quickly and cheaply excavating the basin. The depth may vary, the most desirable depth being probably somewhere near ten feet. The dikes may be reinforced by means of a growth of willow saplings or by any other desired means to prevent and to arrest erosion by the river during high water. Willows naturally grow in such localities and if given time they will seed themselves, but the establishment of the willows may be hastened by planting saplings or cuttings in the dikes.

Figure 1:
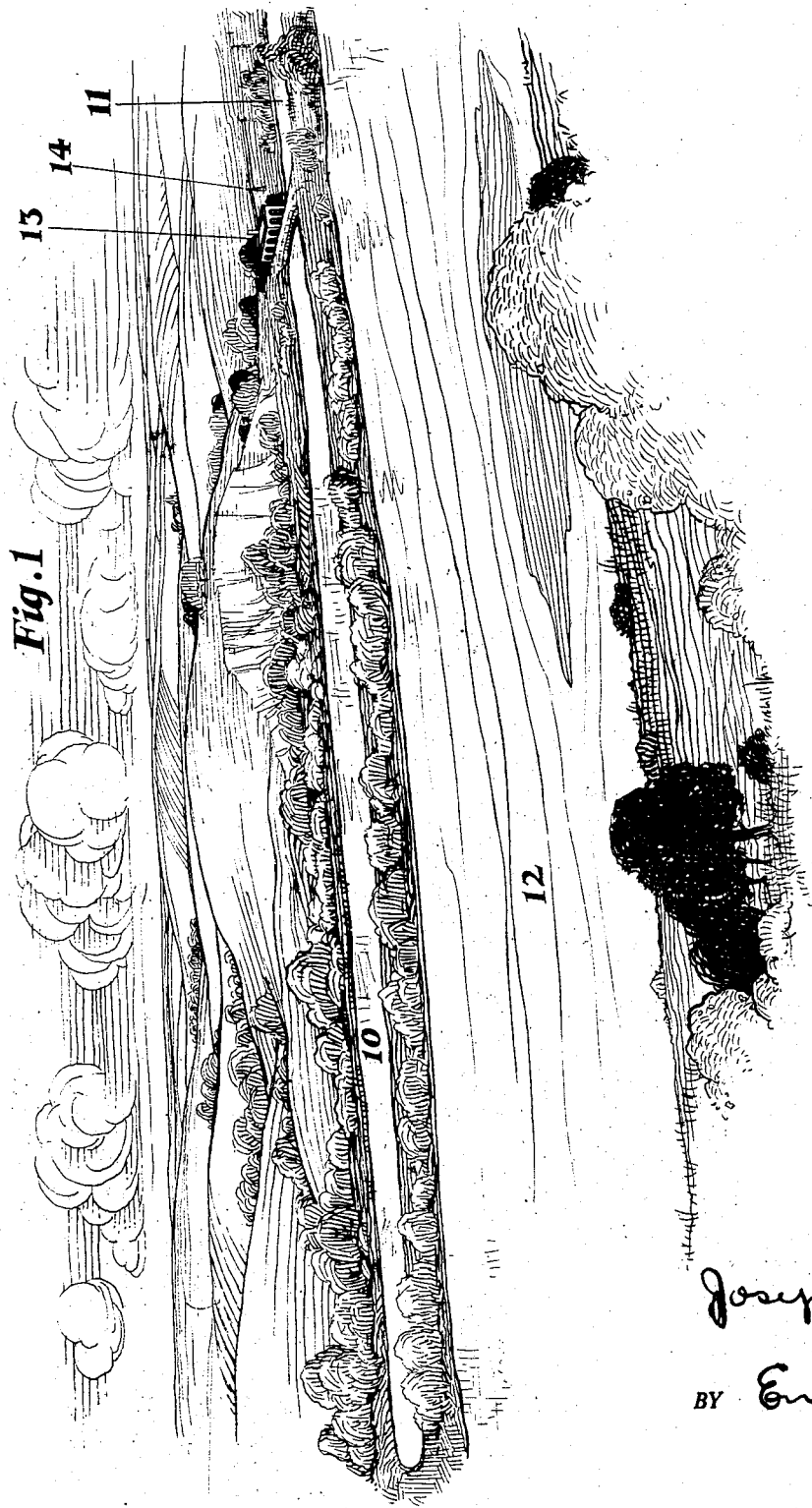
Figure 1 is a bird's eye view of a portion of the stream, showing also the catch basin and canal which I construct for carrying out my invention.
Figure 2:
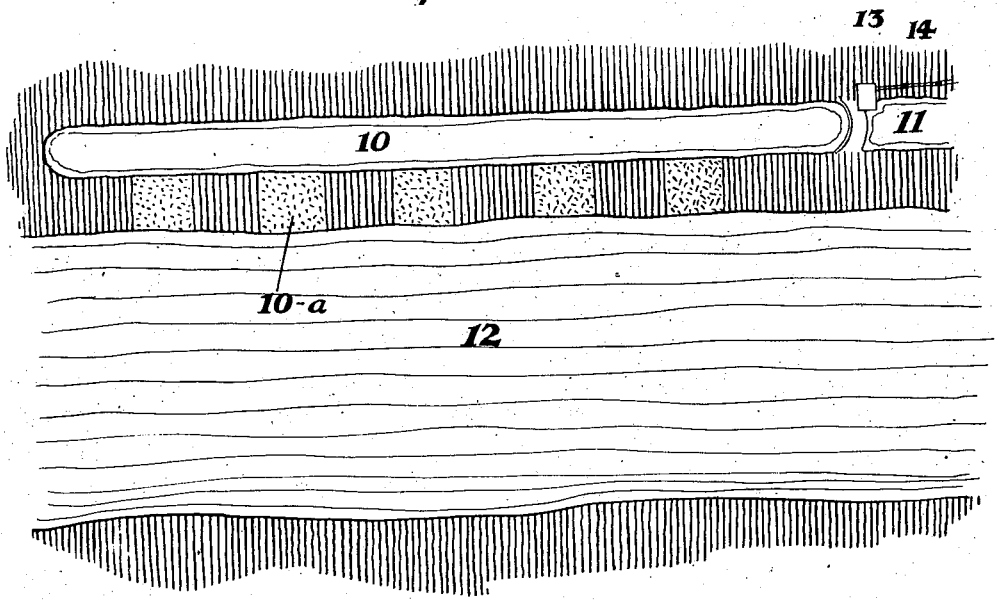
Figure 2 is a diagrammatic plan view of the seepage basin, showing the relation of the basin to the stream and to the power canal, and showing also additional means for providing horizontal seepage.
Figure 3:
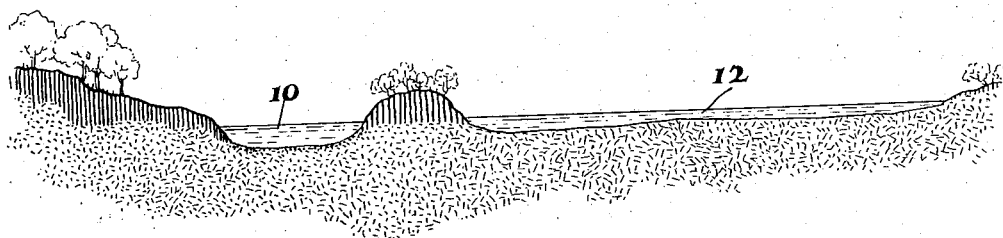
Figure 3 is a cross section of a portion of a valley with a river bed and a catch basin.

The catch basin is often apt to have a bottom of fine sand which would rush upwardly with the seepage water and soon fill the catch basin. To prevent this I apply a coating of clean and relatively coarse gravel all over the bottom and sides of the catch basin 10 as shown in Figure 3. The layer of gravel permits the free flow of water therethrough but it holds back the sand. The water enters the catch basin by seepage only, and never directly from the visible stream. This seepage may be in a vertical direction from the underflow alone or it may be also in a horizontal direction from either or both the underflow and the visible stream. To facilitate the horizontal seepage I provide seepage channels 10$^a$ as shown in Figure 2. At the time of formation of the seepage basin 10 the channels 10$^a$ are cut, connecting the basin with the stream, and these channels are then filled with a good seepage material like coarse sand or gravel.

The power canal has its head at or near the foot of the catch basin, the level being somewhat above that of the bottom of the catch basin. The power canal has less water than that of the catch basin and it is built in a clayey soil through which the water cannot readily seep. The flow of water in the catch basin thus forces the water into the power canal, where it is carried down a grade to any desirable distance to a power house.

It will readily be apparent that the water in the gravel subsoil will rise into the catch basin as fast as it is taken out, and that it will have practically the same level in the catch basin as it has in the river. In the lower portion of the catch basin, however, the flow of water is checked because of the restricted outlet, the consequence being that the water tends to back up against the lower wall of the catch basin. The level of its lower end should be about four feet above that of the river at that point. This increased level is usually sufficient to lift the water to the inlet end of the power canal. In some cases, however, it is desirable to add a pumping equipment for lifting all or a portion of the water into the power canal, and for this reason I have provided the pumping plant 13 with the transmission line 14.

The seepage in the large bed of gravel paralleling and underlying the river is so great that if a twelve inch pipe is inserted in any position thereof, it will supply a thousand gallons of water a minute. In one instance, a pit sixteen feet square was sunk ten feet below the surface of the water level, and it was found that this pit could supply sixteen thousand gallons of water per minute.

It would be impossible to conduct the water directly from the river into the power canal. The water in rivers of this type is usually very turbulent and carries drift as well as sand and gravel in suspension with the result that the canal would soon be choked with sand. On the other hand, the water in the catch basin is relatively quiescent and it contains no drift. At the season of the year when ice is breaking up the river is often choked by chunks of ice, but the ice in the catch basin would not disturb the flow of water in the power canal, as the ice of the river would were the water led directly from the river into the catch basin. When the basin is one mile long, three hundred feet wide and ten feet deep the taking out of 4500 cubic feet of water per second will produce a current in the catch basin of only one and one-half feet per second. At this slow rate of movement the sand and gravel will not be churned, but will remain at the bottom of the basin where they cannot enter the power canal.

As before stated, the flow of the water from the catch basin to the power canal is a gravity flow. Where the topographic conditions are such that this arrangement is impossible the pumping equipment must be utilized. Even in extreme cases, however, the lift is very slight compared with the results accomplished. I find that the lift of 4500 cubic feet of water per second to a height of one and a half feet requires 1000 H. P. With a head of 145 feet this quantity of water will generate 58500 H. P. With the 1000 H. P. deducted from this for pumping purposes there is a net gain of 57500 H. P. from this one plant alone.

It is my purpose to install power development plants of the kind described in streams having the characteristics of the Platte. In Nebraska alone the Platte, Niobrara, Republican, and the Loup Rivers would furnish at least two thousand miles of water power which is now going to waste.

No method has heretofore been devised for successfully coping with this problem. The great depth of the sand and gravel makes it impossible to find secure footing for a dam, except at prohibitive cost. The dam would be subject to enormous pressure from up stream, not only from the water current but from the current of flowing sand and gravel. Even though the dam were sunk to a rock or clay foundation, the water would still flow around the dam through the gravel bed without appreciably raising the water level. This difficulty could be overcome with a dam only by extending the dam entirely across the gravel bed and to its bottom. To be effective such a dam must be about forty miles long and a hundred or more feet deep, and its cost would be out of proportion to the power developed. Such a dam, or any other dam must be reinforced against the pressure of the water current and against the gravel drift and against the flowing ice and other river drift. Moreover, the dam would be ineffective since the gravel and sand drift would enter the power canal and completely choke it.

My system differs radically in several respects from prior systems. It is true that my power canal is to a degree analogous to a millrace, but whereas the millrace taps the current of the stream, my power canal obtains its water from the catch basin which also has no direct connection with the stream. The catch basin obtains the water by seepage from the underflow. Despite the fact that enormous quantities of water are thus obtained there are no strong currents because the seepage area is relatively large. This and the fact that the down stream current has a low rate of movement does away with all agitation of the water which would bring the troublesome sand and gravel to the surface. Furthermore the seepage from the underflow has a more constant temperature than that of the surface water and this combined with the fact that the seepage movement is coextensive with the basin prevents the freezing of the water in the basin except at very low temperature.

I have thus far described my invention in its relation to power production, but it is obvious that other applications, such as irrigation, may overshadow power production in importance. In nearly all localities having streams of the kind described, the rainfall is apt to be somewhat irregular during the crop growing season, making irrigation extremely desirable and in fact absolutely necessary for obtaining the maximum crops. This need and also the superabundant water supply have long been recognized and I find that there are hundreds of idle irrigation ditches in Nebraska and the adjoining States, these ditches having been abandoned when their intake ends were clogged with silt. These ditches were moreover only partially successful when new, because receiving the water from the visible river current, they were dependent on the level of the water of the visible river, and this level is apt to be low at the very times that the irrigation water is most needed. While there is unlimited water to supply abundant irrigation the canals and ditches have been made worthless. With my plan, by going outside the river or stream, sinking a basin of sufficient size to supply the water, and installing a pump to raise the water into the canal or ditch, I turn defeat into success. Preliminary tests indicate the possibilities of the plan. For example, a test was made on the underflow of the Platte River at Kearney, Nebraska, covering a period of ten days. During that period a stream of three and a half cubic feet of water per second was pumped through a twelve inch pipe from the subsoil water of the Platte, this rate of flow being sufficient to cover a thousand acres one foot deep in a hundred and fifty days. This is merely cited as an example of the possibilities of my seepage basins which of course receive the seepage from a very much larger area than that of a twelve inch pipe.

Having thus described my invention in terms which will be readily understood by others skilled in the art to which it pertains, what I claim as new and desire to secure by Letters Patent of the United States is:—

1. Means for utilizing the flowing subsurface water streams which flow through a relatively wide and deep body of water bearing sand and gravel, comprising a catch basin adapted to be placed along the side of a visible stream and separated therefrom to receive a water supply to the catch basin by seepage from the water bearing sand and gravel, a plurality of spaced gravel filled channels disposed between the visible stream and the catch basin for conducting water by seepage to the catch basin, a gravel lining for said catch basin to prevent ingress of quick sand into the catch basin, and a power canal communicating with the catch basin and receiving water therefrom.

2. In combination with a subterranean stream in a sand and gravel subsoil at the side of a visible stream, a catch basin in the sand and gravel subsoil for receiving a water supply by seepage from the subterranean stream, said catch basin being substantially parallel to the visible stream and being relatively long and relatively narrow and having its downstream end at a level higher than the level of the visible stream at a point adjacent the downstream end of said catch basin, whereby a head of water is provided at the downstream end of said catch basin, a gravel lining for said catch basin to prevent ingress of quick sand thereinto, gravel filled channels from the visible stream to said catch basin, and a canal communicating with said catch basin at its downstream end and receiving water therefrom.

In testimony whereof I affix my signature.

JOSEPH BURNS.